United States Patent
Chalut et al.

(10) Patent No.: US 11,882,367 B2
(45) Date of Patent: Jan. 23, 2024

(54) IMAGE PROCESSING METHOD FOR PRODUCING A HIGH DYNAMIC RANGE IMAGE OF A SCENE

(71) Applicant: Connaught Electronics Ltd., Tuam (IE)

(72) Inventors: Samantha Chalut, Tuam (IE); Patrick Denny, Tuam (IE); Brian Deegan, Tuam (IE)

(73) Assignee: CONNAUGHT ELECTRONICS Ltd., Tuam (IE)

( * ) Notice: Subject to any disclaimer, the term of this patent is extended or adjusted under 35 U.S.C. 154(b) by 0 days.

(21) Appl. No.: 17/769,673

(22) PCT Filed: Oct. 13, 2020

(86) PCT No.: PCT/EP2020/078728
§ 371 (c)(1),
(2) Date: Apr. 15, 2022

(87) PCT Pub. No.: WO2021/074122
PCT Pub. Date: Apr. 22, 2021

(65) Prior Publication Data
US 2023/0156345 A1 May 18, 2023

(30) Foreign Application Priority Data
Oct. 18, 2019 (DE) ...................... 10 2019 128 219.5

(51) Int. Cl.
*H04N 23/745* (2023.01)
*H04N 23/667* (2023.01)
(Continued)

(52) U.S. Cl.
CPC ......... *H04N 23/745* (2023.01); *H04N 23/667* (2023.01); *H04N 23/71* (2023.01); *H04N 23/73* (2023.01); *H04N 23/741* (2023.01)

(58) Field of Classification Search
CPC .... H04N 23/745; H04N 23/667; H04N 23/71; H04N 23/73; H04N 23/741
See application file for complete search history.

(56) References Cited

U.S. PATENT DOCUMENTS 10,193,627 B1 * 1/2019 Herman ................ H04N 23/741
10,255,888 B2 * 4/2019 Narasimha .............. G06T 5/008
(Continued)

FOREIGN PATENT DOCUMENTS

CN            206568652 U   10/2017
DE    20 2017 006 792 U1    5/2018
(Continued)

OTHER PUBLICATIONS

International Search Report and Written Opinion issued in corresponding International Patent Application No. PCT/EP2020/078728, dated Jan. 13, 2021 (11 pages).

(Continued)

*Primary Examiner* — Ahmed A Berhan
(74) *Attorney, Agent, or Firm* — Osha Bergman Watanabe & Burton LLP (57) ABSTRACT

An image processing method comprises: performing a spectral analysis of a HDR image (220) to determine whether the HDR image (220) comprises spectral components indicative of a lighting of the scene by a modulated light source; analysing meta-data associated with a set of component images (221) for the HDR image to determine a difference between meta-data for one component image of the set and meta-data for at least one other component image of the set, any difference being indicative of an artefact caused by illumination of the scene by a modulated light source; combining a result of the spectral analysis and the meta-data analysis to provide an indication that illumination of the scene by a modulated light source is causing a visible artefact in at least one of the HDR images; and changing a (Continued)

HDR operating mode of the image processing system (200) accordingly.

15 Claims, 8 Drawing Sheets

(51) Int. Cl.
*H04N 23/71* (2023.01)
*H04N 23/741* (2023.01)
*H04N 23/73* (2023.01)

(56) References Cited

U.S. PATENT DOCUMENTS

| | | | |
|---|---|---|---|
| 2004/0012692 A1 | 1/2004 | Arazaki | |
| 2008/0198235 A1* | 8/2008 | Chen | H04N 23/73 348/E5.025 |
| 2008/0317378 A1 | 12/2008 | Steinberg et al. | |
| 2009/0297036 A1 | 12/2009 | Badino et al. | |
| 2012/0320232 A1 | 12/2012 | Trumbo | |
| 2019/0208106 A1 | 7/2019 | Lukac | |

FOREIGN PATENT DOCUMENTS

| | | |
|---|---|---|
| WO | 2011/000392 A1 | 1/2011 |
| WO | 2018/211511 A1 | 11/2018 |
| WO | 2019/068699 A1 | 4/2019 |

OTHER PUBLICATIONS

Search Report issued in corresponding German Patent Application No. 10 2019 128 219.5, dated Apr. 29, 2020 (4 pages).

Deegan, Brian, "LED flicker: Root cause, impact and measurement for automotive imaging applications", IS&T International Symposium on Electronic Imaging, Autonomous Vehicles and Machines Conference, pp. 146-1-146-6, 2018 (6 pages).

Ilg, Eddy et al., "Flownet 2.0: Evolution of Optical Flow Estimation With Deep Networks", IEEE Conference on Computer Vision and Pattern Recognition (CVPR), 2017 (11 pages).

Tominaga, Shoji et al., "Color Temperature Estimation of Scene Illumination", Color and Imaging Conference, Society for Imaging Science and Technology, pp. 42-47, 1999 (7 pages).

* cited by examiner

IMAGE PROCESSING METHOD FOR PRODUCING A HIGH DYNAMIC RANGE IMAGE OF A SCENE

FIELD

The present invention relates to a method of processing component images for producing a high dynamic range (HDR) image of a scene.

BACKGROUND

Vehicle systems, such as automatic emergency braking, autonomous or semi-autonomous parking or driving systems, rely on image acquisition systems to provide support for the operation of the vehicle.

Figure 1:
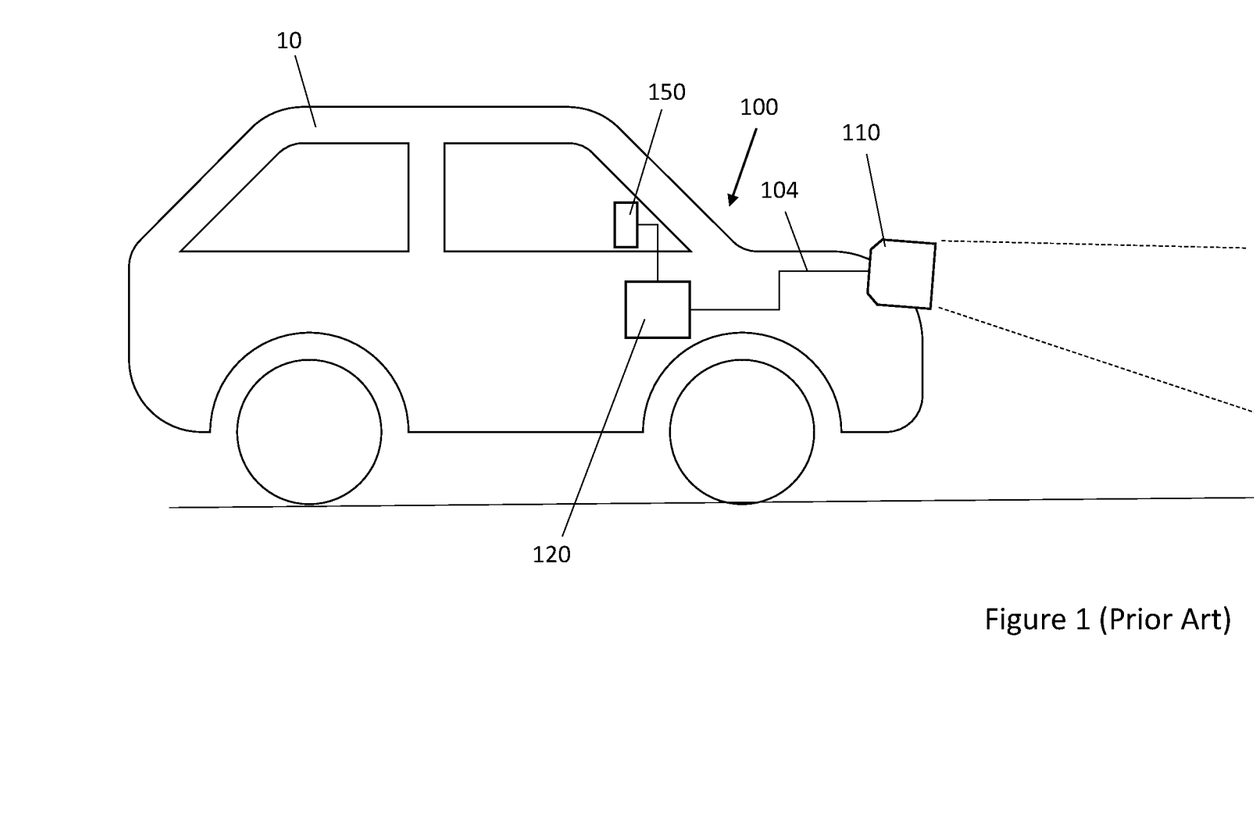
FIG. 1 illustrates a side view of a vehicle comprising an image acquisition system according to the prior art.

Referring to FIG. 1, an image acquisition system 100 typically comprises one or more camera modules 110 disposed around a vehicle 10 and arranged to capture images of a scene before providing such images either across a vehicle bus 104 such as a CAN or Flexray bus or a dedicated camera connection to a processor 120 for processing the image. The processor 120 is connected to one or more display devices 150 for displaying the images provided by camera modules 110.

In night driving conditions, where there can be a large range of illumination within a given scene being imaged, for example with streetlights and dark portions of road surface or surrounding environment, a single exposure image will either tend to allow over illuminated regions of the image to saturate so that dark regions of the scene can be correctly imaged or if saturation is avoided, then dark regions will be under illuminated with loss of detail.

Some camera modules 110 include image sensors which can be used to produce High Dynamic Range (HDR) images by capturing a sequence of component images (sometimes referred to as an image stack), containing at least a long exposure time (LET) image, which allows low light features to be captured, and at least a short exposure time (SET) image, which allows bright features to be captured properly.

In the present specification, the terms component image and HDR image are used to mean data for such images which can be received by a processor and provided to a display for viewing.

Exemplary HDR image sensors include AR0270AT or AR0143AT which are available from On Semiconductor of Phoenix Arizona. Such image sensors can include pixel architectures comprising either a split diode pixel architecture that simultaneously acquires overlapping long and short exposure images or staggered HDR technology where component images are acquired successively.

In any case, component images may be merged at the processor 120 by selecting correctly exposed portions from the component images to output a composite HDR image where both low light and bright features can be displayed properly.

"LED flicker: Root cause, impact and measurement for automotive imaging applications", Brian Deegan, pages 146-1 . . . 146-6, IS&T International Symposium on Electronic Imaging, Autonomous Vehicles and Machines Conference 2018 discloses that acquiring such sequences of component images in scenes illuminated by modulated light sources can cause unacceptable artefacts in the displayed HDR image.

It is an object of the present invention to address these problems.

SUMMARY

Accordingly, in a first aspect the application provides an image processing method according to claim 1.

In a second aspect, the application provides an image processing method according to claim 2.

In a further aspect, there is provided a computer program product which when executed on a computing device is arranged to perform the method of either claim 1 or claim 2.

In a still further aspect, there is provided a system arranged to perform the steps of either claim 1 or claim 2.

Advantageous embodiments are provided in the dependent claims.

BRIEF DESCRIPTION OF THE DRAWINGS

An embodiment of the invention will now be described, by way of example, with reference to the accompanying drawings, in which.

DETAILED DESCRIPTION OF THE DRAWINGS

Figure 2:
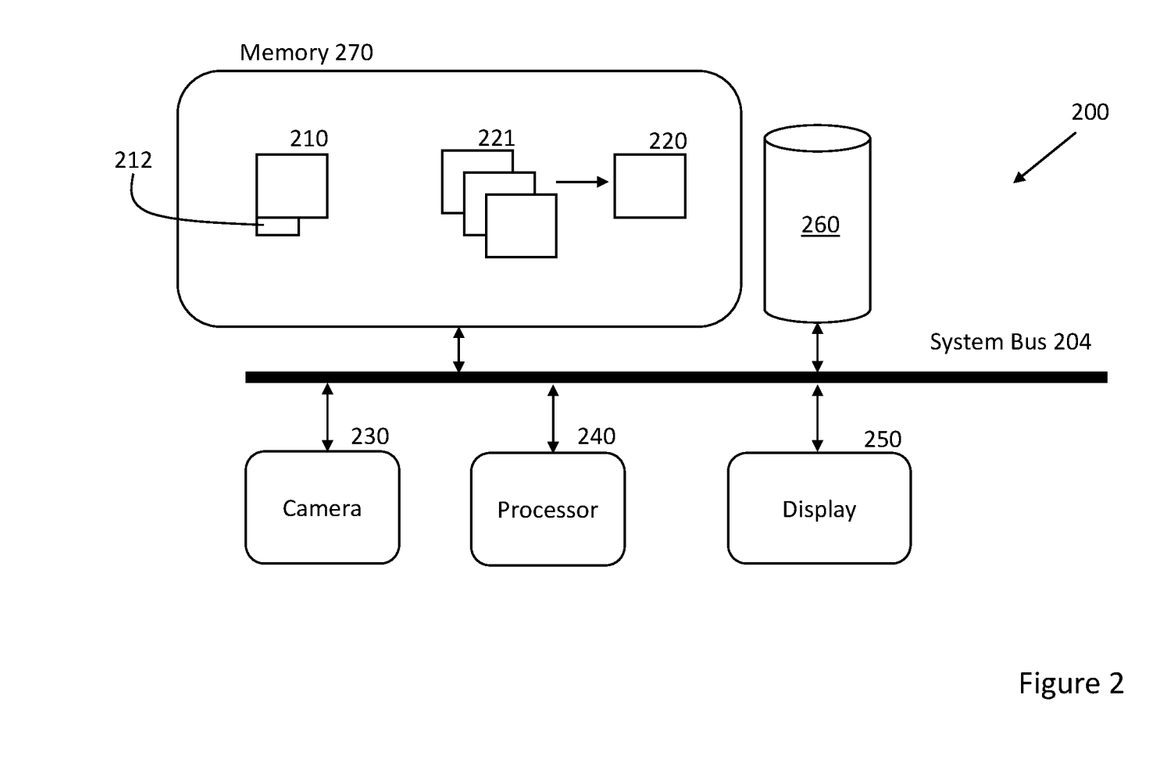
FIG. 2 is a block diagram illustrating a configuration of an image processing system according to an embodiment of the invention.

FIG. 2 illustrates a block diagram illustrating a configuration of a system 200 according to an embodiment of the present invention. The system 200 comprises one or more image capturing devices 230 (only one shown), one or more displays 250 (only one shown), a database 260 and a memory 270 being connected to an image processor 240 via a system bus 204. (It will be appreciated nonetheless that the components of the system can also be connected by any of wired or wireless connection.) In some embodiments, the image processor 240 can be incorporated within an electronic control unit (ECU) separate from the one or more image capturing devices 230 and connected to the image capturing devices 230 via the system bus 204, for example, a CAN or Flexray bus or a dedicated camera connection, whereas in other embodiments, the image processor 240 and one or more image capturing devices 230 could be integrated—for example, an image capturing device and image processor could comprise an integrated rear view camera unit.

The one or more image capturing devices 230 can comprise any type of image capturing device for capturing an image in at least the visible light spectrum. The one or more image capturing devices 230 may be digital cameras such as complementary metal-oxide semiconductor (CMOS) cameras, charged coupled device (CCD) cameras or the like.

The one or more image capturing devices 230 may be disposed in any part of the vehicle to capture an input image of the surrounding scene. Input images may have different or same resolution and/or format and comprise image information in any combination of intensity planes, such as YCC, YUV or LAB; or any combination of colour planes, for example, RGB.

In some embodiments, the one or more image capturing devices 230 may be operated in a single exposure mode or a multi-exposure mode to capture HDR content of a scene; whereas in other embodiments, the devices 230 may be operated always in a multi-exposure mode. When operated in single exposure mode, a device 230 is configured to acquire a single exposure 210 of the scene which is stored in a memory 270 of the system 200, possibly processed and then displayed. On the other hand, when operated in multi-exposure mode the device 230 is configured to acquire a plurality of component images of the scene at different exposures, with each component image being stored as a component image 221 for the scene in the memory 270. Each of the single-exposure 210 and component images 221 have associated metadata 212. The metadata 212 comprises information relating to the captured image including, for example, white balance information, sensor gain and exposure time for the image. The metadata 212 may be included in a header of an image file or provided separately.

When operated in multi-exposure mode, the component images 221 may be merged by the processor 240 to provide a HDR image 220 of the scene which can also be stored in the memory 270 and displayed. It is also possible when operating in multi-exposure mode, to only select one of the component images 221 for display when it is deemed not suitable to display a HDR image, for example, as will be explained below.

It will be appreciated that input images 210, 221 captured from the one or more devices 230 may be processed to select a region of interest (ROI) from the image and/or their resolution may be reduced. The processor 240 may use the ROI as an input image for subsequent processing and/or display.

The processor 240 may comprise a single general-purpose processor; a dedicated processor or a multi-processor core comprising a plurality of either dedicated or general-purpose processors which may perform certain processing in parallel. It will be appreciated that the term general-purpose processor applies to large instruction set processors as well as RISC processors such as those provided by ARM.

Figure 3A:
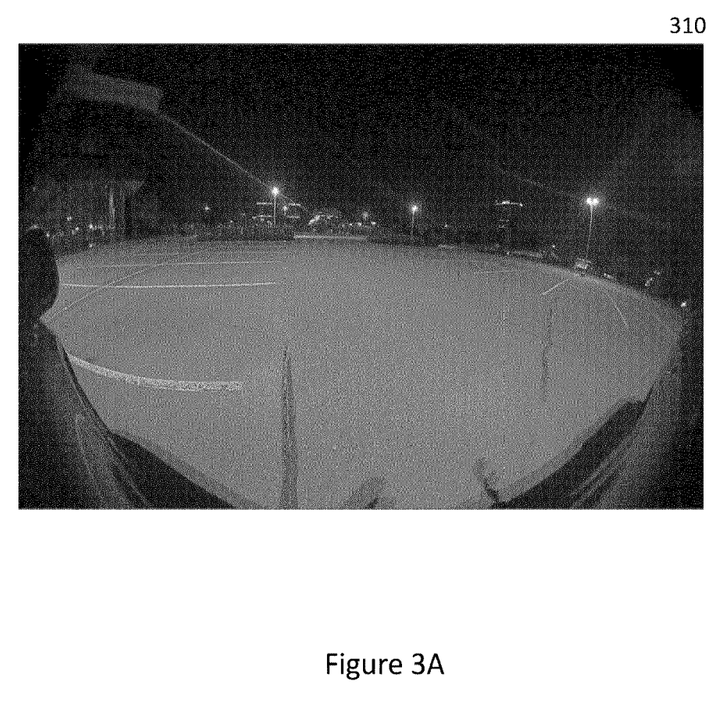
FIG. 3A illustrates an image of a scene without artefacts caused by the light source.
Figure 3B:
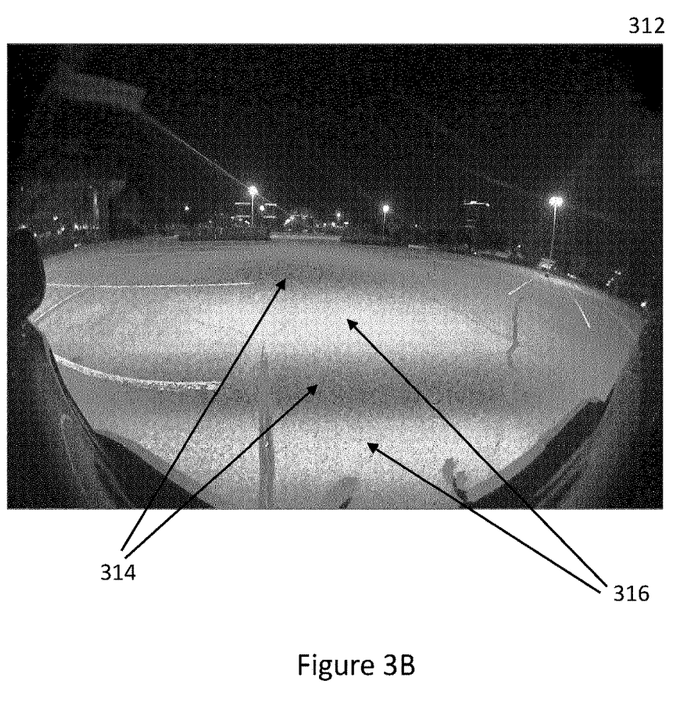
FIG. 3B illustrates an image of the scene of FIG. 3A including artefacts caused by the light source.

FIGS. 3A and 3B illustrate respectively a single exposure image 310 and a HDR image 312 of the same scene. The scene is a typical night driving scenario including multiple illuminants and more specifically an illuminated parking lot. This scenario is exemplary of standard scenarios that occur frequently during night driving. Other examples of scenarios include driving under sodium vapour lights, driving with headlights on, driving in tunnels etc. Notably, the scenario includes low light and bright features.

In the single exposure mode, the capturing devices 230 capture an image having relatively reduced dynamic range where in this case, detail of low light regions is lost.

In multi-exposure mode, a plurality of component images 221 is processed together at the processor 240 to provide a HDR image 312 of the same scene. In this operating mode, the merging results visible artefacts/anomalies 314, 316 in the displayed HDR image 312.

It is appreciated that, although the artefacts 314, 316 are shown in shades of grey in FIG. 3B, these may have different or the same colour and/or different or the same colour intensity. For example, the first group of artefacts 314 may alternatively be purple and the second group may be yellow or vice-versa. In this image, the artefacts of the first group alternate with those of the second group to form a number or successive horizontal bands.

As indicated in the introduction, it is appreciated that these artefacts in HDR images can be caused by illumination of the scene by one or more modulated light sources. In modulated light sources, any one or more of the amplitude (intensity), phase, frequency, or polarization of the radiated light is changed. Examples of modulated light sources include 50 Hz or 60 Hz light sources, sodium lamps, pulsed width modulated (PWM) light sources such as PWM driven LED lighting, or the like. If the state of the light source is different when capturing one component image for a HDR image than another, then when the component images are merged, artefacts such as illustrated in FIG. 3B can occur.

As will be appreciated, mechanical solutions such as disclosed in CN 206568652 U which provides a physical membrane to remove rainbow noise from a display apparatus are not effective to address such artefacts.

Figure 4:
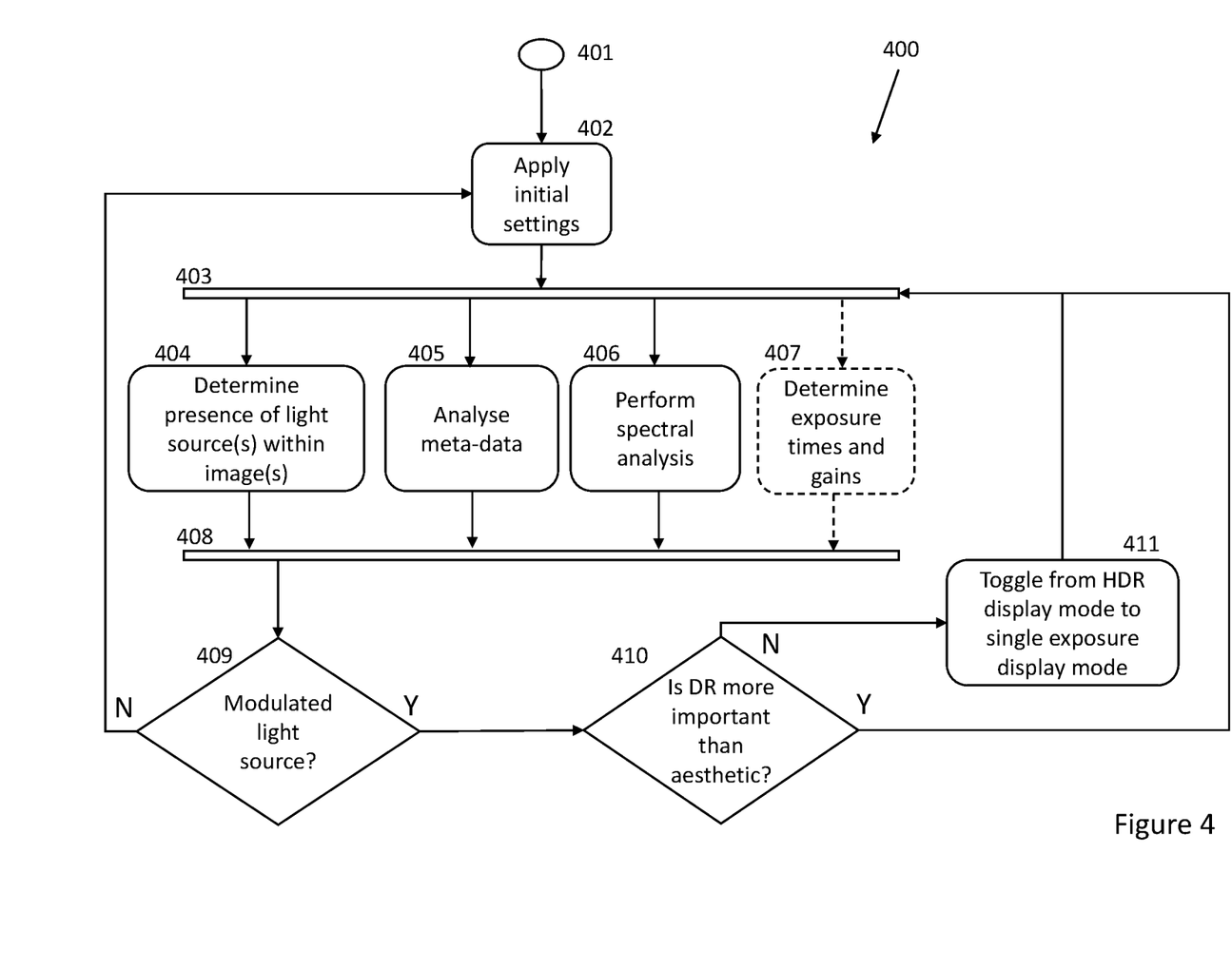
FIG. 4 is a block diagram illustrating an image processing method performed in the system of FIG. 2.

With reference to FIG. 4, there is shown a state machine flow 400 of an image processing method for avoiding the display of artefacts caused by modulated light sources. Although this method is described hereinbelow with reference to a single image capturing device 230, it will be appreciated that it can be extended to a plurality of image capturing devices.

The method starts at step 401 where the image processing system 200 is activated. At step 402, initial camera settings are applied to the capturing device 230. Initial settings include initial exposure controls and parameters associated with the configuration of a HDR exposure. These parameters can be changed, for example, to regulate the exposure times and exposure ratios of component images 221 for the HDR image and even parameters determining how the component images are composited to provide the HDR image 220. These parameters are typically only changed gradually from frame to frame to avoid sudden visual changes between successively displayed HDR images.

At step 403 the capturing device 230, operating in multi-exposure mode, captures component images 221 of the scene in accordance with the parameters set in step 402. The component images 221 are then sent to the processor 240 to provide a HDR image 220 of the scene in what may be a conventional fashion.

In the embodiment, a number of different tests are then performed on the acquired component images 221, their associated meta-data and the composite HDR image 220 to determine if the HDR image 220 may be suffering from illumination source induced artefacts.

At step 404, the spatial content of one or more of the component images 221 or the composite image 220 is analysed for the presence of one or more light sources within the image(s) of the scene. This analysis can be performed in a number of ways including using algorithmic analysis, heuristics and/or artificial neural networks or other classifiers to identify such light sources.

Some such analysis is based on either explicitly or implicitly identifying the presence of hotspots within one of more of the images 220, 221. Hotspots comprise a region of contiguous pixels whose channels that represent brightness in the image, for example, a Y channel in YCC or YUV format images, L channel in LAB format images, or one of more of the colour channels in RGB format images, are clipped or saturated in the sense that they have the same or close to a maximum intensity value.

Thus, knowing the location of the camera with respect to the road surface including its height above the surface, as well as the angular orientation of the camera (pitch, yaw and roll) and field of view of the camera based on the camera projection model, rules can be determined to identify hotspots of an expected shape, size and/or location within the field of view which might comprise one or more vehicle headlights or streetlights.

Vehicle headlights usually appear towards the centre of an image, possibly in a pairwise fashion with an orientation close to parallel with a road surface and up to about a metre above the road surface. Typically, vehicle headlights appear as an elliptical hotspot with a greater horizontal extent than vertical extent.

In contrast to car headlights, street lights usually appear several metres above the ground and along lines radiating out from the centre of image.

However, it is appreciated that hotspots are not limited to street lights or vehicle headlights and it will be appreciated that if other light sources such as taillights are regarded as causing artefacts in HDR images, the images 220, 221 can also be analysed for the presence of such sources.

In terms of size, the expected size of headlight/streetlight hotspots within an image will of course vary according to the distance of an oncoming vehicle from the ego vehicle or the distance of streetlights from the ego vehicle.

This distance of oncoming vehicles or streetlights can be determined using a number of different techniques including: intrinsic image analysis; depth from disparity—comparing the displacement of image features in one image with the same features in another image acquired from a different point of view (i.e. a stereo camera or a image from a given camera acquired at a different time) or using, for example, input from radar sensors disposed around the ego vehicle. Other techniques such as using optical flow from a sequence of images acquired by the camera as described in Ilg E, Mayer N, Saikia T, Keuper M, Dosovitskiy A, Brox T, "Flownet 2.0: Evolution of optical flow estimation with deep networks", IEEE Conference on Computer Vision and Pattern Recognition (CVPR) pp 1647-1655, 2017, or WO2019/068699 (Ref: SIE 524) or US 2009/0297036, Klappstein et al. can be used to determine if hotspots comprise headlights of an oncoming vehicle or streetlights.

In addition or as an alternative to explicitly looking for hotspots of a given size, shape and/or location to provide a confidence value for the presence of light sources within an image of a scene, classifiers can be trained to detect hotspots corresponding the light sources within an image. In such cases, the one or more images 220, 221 may be processed using an image classifier, a semantic segmentation network or a dedicated function to recognize such regions of contiguous pixels and, in response, provide a confidence score indicative of the presence of problematic light sources within the images 220, 221. Exemplary image classifiers and semantic segmentation network can include suitably trained neural network classifiers or semantic segmentation networks. Semantic segmentation networks may divide an image into sub-regions and label these regions in accordance with their content, with each pixel being labelled with the class of its enclosing object or region.

It is appreciated that the identification of light sources within the images 220, 221 at step 404 may also take into account information such as the time of the day (as hotspots are likely to occur at night) and also the location of the vehicle (to determine if the vehicle is being operated in a tunnel or parking garage that is likely to be illuminated by modulated light sources). For the latter, the system 200 may acquire the position of the vehicle using a location sensor such as a GPS sensor and compare this with map information to supplement hotspot identification.

At step 405, meta-data associated with the component images 221 and the HDR image 220 is analysed to determine if the component images 221 have been acquired under the illumination of a modulated light source in a manner likely to cause visible artefacts in the HDR image.

One such technique comprises determining a colour temperature for each component image 221. Such information can either be generated at the time of capturing each component image and stored in meta-data associated with each component image in memory 270; or alternatively, the processor 240 may calculate colour temperature for example as disclosed in Tominaga, Shoji & Ebisui, Satoru & Wandell, Brian, (1999), "Color Temperature Estimation of Scene Illumination", Tech Rep IEICE. PRMU99-184. 42-47 for each component image 221. In particular, the processor 240 calculates an overlap between a colour gamut calculated for one component image and another component image and provides a correlation value between the two. If the colour temperature of one component image differs by more than a threshold amount from the colour temperature of at least one other component image, so having a low correlation value, then this indicates the potential for unwanted artefacts in the HDR image 220. Thus, the more strongly colour temperatures for component images differ from one another, the greater the possibility that the HDR image 220 will include artefacts due to illumination with a modulated light source.

Other tests of image meta-data can also be performed, for example, by comparing the difference between white balance information for one component image 221 and others of the component images 221. Again, the more strongly white balance information for component images differ from one another, the greater the possibility and the higher the confidence that the HDR image 220 will include artefacts due to illumination with a modulated light source.

At step 406, a spectral analysis of the HDR image is performed to determine if it comprises spectral components indicative of the lighting of the scene by a modulated light source. Although an exemplary implementation will be described in more detail in relation to FIGS. 5-8 below, in general this step comprises generating a spectral energy distribution of the HDR image 220 and determining if there is a correlation between the power spectrum of the HDR image 220 and power spectra of one or more known modulated light sources stored in the database 260. The correlation corresponds to a confidence value indicative of the likelihood that the scene is illuminated by the known modulated light source.

Note that each of steps 404-406 need not be performed on every set of component images 221 and corresponding HDR images 220 and for example, sometimes one or more of the steps may be performed on one set of images 220, 221 and the remaining step(s) performed on subsequently acquired images 220, 221. The steps can be executed at a regular time interval within a predetermined time period or in response to a changing scenario for example, in response to the content of an image changing substantially or the location of the ego vehicle changing by more than a threshold amount.

At step 407, the system 200 can acquire exposure times and gains of the component images 221 again from meta-data associated with the images and this information be used as a basis for further tests to determine if a scene is being illuminated by a modulated light source and/or if artefacts are likely to arise from this illumination; or simply to adjust the settings for the acquisition of a subsequent set of component images at step 402.

At step 408, the system 200 determines a weighted sum or other such combination of the confidence values generated at steps 404, 405 and 406. Thus, if the tests from steps 404 and 406 signal that a scene is being illuminated by a modulated light source and, if the test of step 405 signals that component images when combined may cause visible artefacts, a high result would be provided, whereas even if the confidence level from steps 404 and 406 were high, low results from step 405 would signal that no unwanted artefacts were likely to be generated in the HDR image 220, and so a lower result would be provided. Once, the result has been determined the system 200 proceeds to step 409.

At step 409, the system 200 tests if the result from step 408 is greater than a predetermined threshold and if so, it is inferred that the scene is being illuminated by a modulated light source and the HDR image 220 is likely to exhibit unwanted artefacts. In this case, the method proceeds to step 410, where the system 200 determines whether dynamic range (DR) is more important than image aesthetics.

If the dynamic range of displayed images is not critical, the method proceeds to step 411 and switches to displaying a single exposure image. This may be one image of the component images 221 acquired in HDR mode or indeed the system may simply swap to acquiring only a single exposure image for a number of image frames.

If dynamic range is preferred, possibly in response to user input, the system continues to operate in HDR mode and continues to step 403 to acquire a subsequent set of component images accordingly.

If the result from step 408 is lower than a predetermined threshold, then it is inferred that artefacts are not likely to be present in the HDR image 220, even if the scene were being illuminated by a modulated light source, and so the system 200 proceeds to step 402 where it applies the initial setting and acquires component images 221 for a subsequent HDR image 220.

In order to avoid flickering between single exposure and HDR display modes, a pair of thresholds can be used, a higher threshold for switching to single exposure display mode and a lower threshold below which the confidence levels for steps 404-406 must be before the system switches back to HDR display mode.

In such embodiments, when the result from step 408 is between the higher and lower thresholds, it is possible to then adjust the settings employed for multi-exposure such as varying the ratios of long and short exposures times or the number of component images in an attempt to lower the likelihood of artefacts arising from illumination by a modulated light source. For example, the system 200 could make the longest and shortest exposure times of the component images closer to each other.

The result provided in step 408 can not alone be used for deciding to switch between single exposure and HDR display mode, but it can be used to label HDR images as being potentially affected by artefacts and this can be useful in other applications such as advanced driver driving systems (ADAS) and/or machine vision detection algorithms which can rely on the quality HDR images.

In alternative embodiments, artefacts such as the banding illustrated in FIG. 3B may be removed from HDR images using Fourier notch filtering without affecting the quality of the image. This includes performing a Fourier transform of the HDR image, identifying and removing a banding signature in the frequency domain using Fourier notch filtering, and performing an inverse Fourier transform to generate a HDR image without banding.

Although this solution is computationally expensive, it allows removing the artefact without sacrificing the quality of the display image.

Figure 5:
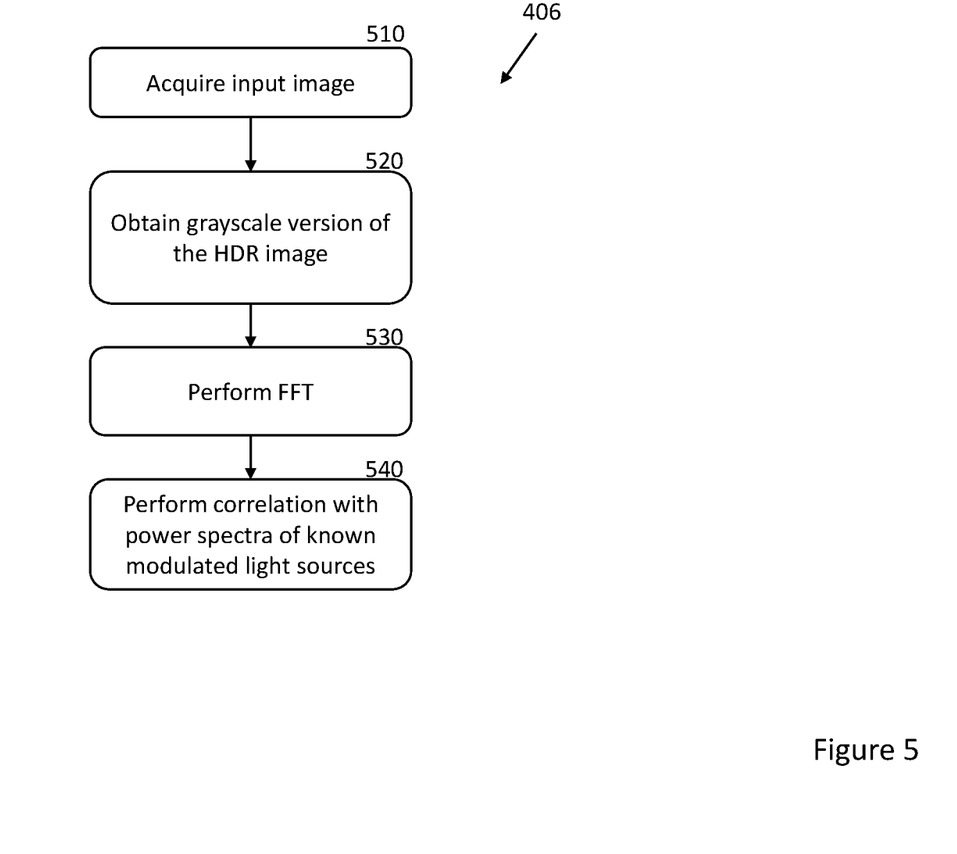
FIG. 5 is a block diagram illustrating details of the image processing method of FIG. 4.

Turning now to FIG. 5, as mentioned above there is shown in more detail of method for performing step 406.

At step 510 the processor obtains the HDR image 220 from the memory 270 of the system 200 and at step 520 generates a greyscale version of the image. If the HDR image comprises an intensity plane, this could be used directly, but in alternative implementations, this could be provided by combining chromatic image plane information.

At step 530 the processor 240 performs a stacked Fast Fourier Transform (FFT) of each of the columns of the greyscale version of the image to generate the spectral energy distribution of the image. The stacked FFT includes removing the component at frequency zero (DC offset) and adding each of the FFTs together to obtain a power spectra across the columns of the image. If a modulated light source is illuminating the scene, this can be manifested as a set of horizontal bands within the HDR image 220. The stacked FFT analysis amplifies their spectral signature relative to the spectral contributions of other scene objects that typically change in character (i.e. amplitude and/or phase) across columns. Accordingly, the appearance of different scene objects across columns have a statistical attenuation in their contribution to the stacked spectral values resulting in a weaker contribution to the power spectra generated. As banding resulting from a modulated light source is typically full-wave rectified, i.e. of the form of the absolute value of a cosine-based signal, its spectral contribution is not just amplified by stacking but more distinct when looking at the Fourier power spectra of the scene.

At step 540 the processor performs a correlation analysis between the power spectra of the HDR image 220 and the power spectra of one or more known modulated light sources stored in the database 260. If the determined correlation value is above a threshold then there is likely a match with the modulated light source and therefore there is a likelihood that the scene is being illuminated by a modulated light source and that this is being manifested in the HDR image. Similarly, the power spectra of the HDR image could be generated for a sweep of spectra and a correlation analysis can be performed over a range of frequencies. This advantageously results in less processing overhead.

Figure 6:
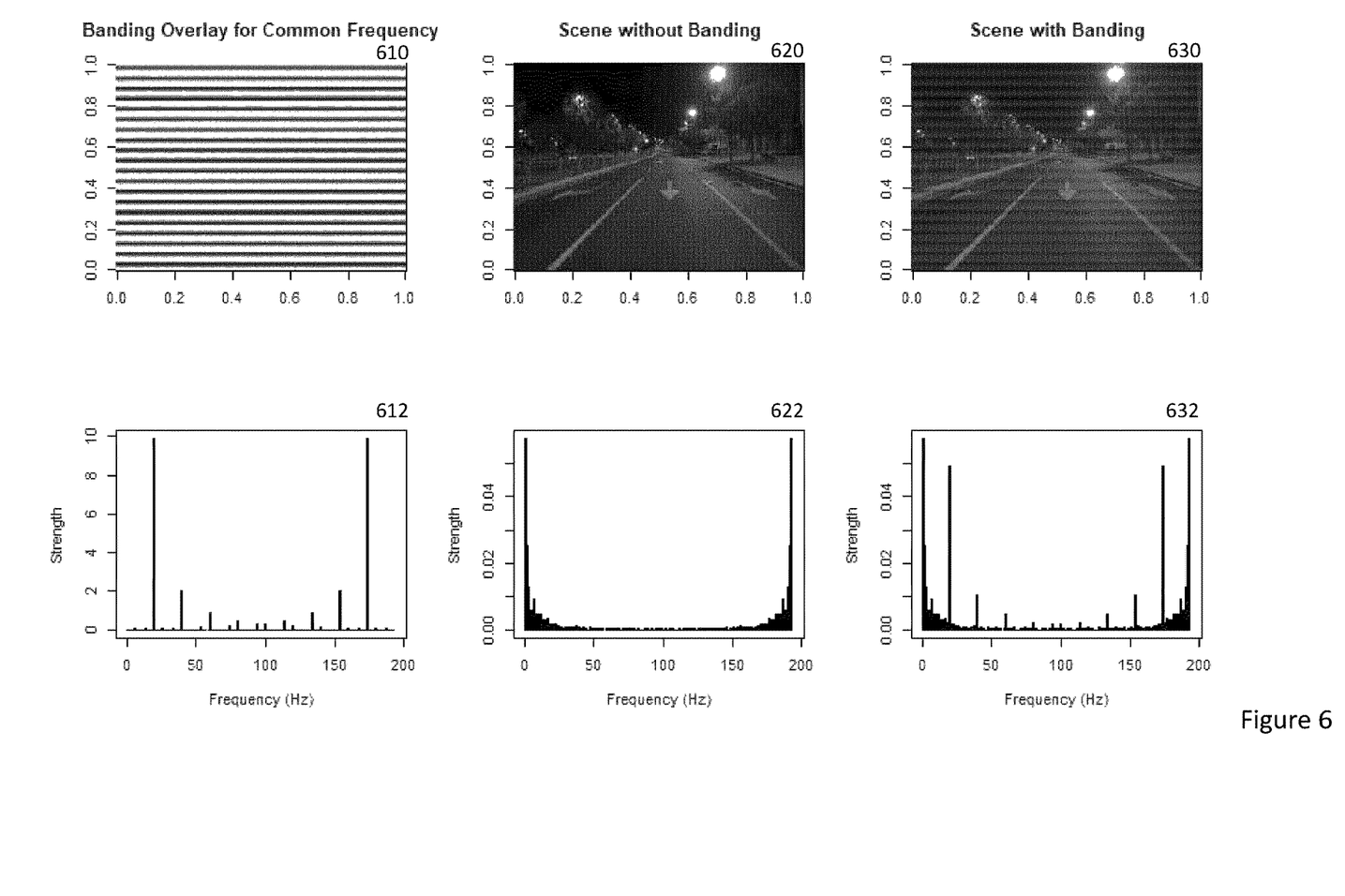
FIGS. 6-8 illustrate examples image processed with embodiments of the present invention.

Referring now to FIG. 6, there is shown an image of a banding overlay 610 of a known modulated light source and single exposure 620 and HDR images 630 of a typical night driving scene under sodium vapour lights. These images are respectively presented in the frequency domain in frames 612, 622 and 632. The banding overlay 610 is captured using multi-exposure mode on a white/grey background and includes a set of visible horizontal bands. The power spectra of the banding overlay are shown at 612. The frequency spectra of the banding overlay include distinct peaks corresponding to frequency components of the spectra, these peaks are the frequency signature of the known modulated light source.

It is noted that the appearance of a regular set of horizontal bands is related to the beating frequency of the modulated light sources. Accordingly, if a modulated light source beats faster/slower than another modulated light source of same or different type, it is expected that the banding overlay is different. Hence, the frequency signature of the light source would be different.

As result of the merging of component images, the HDR image 630 includes banding while the respective single exposure image of the scene 620 does not include banding.

The power spectra 622 of the single exposure image is broad over the range of frequency and does not include peaks that represent the frequency signature of a modulated light source. In contrast, the banding provides a stark contribution to the power spectra of the HDR image 630.

The power spectra correlation value between the banding overlay 610 of the known modulated light source and the HDR image 630 of the scene is high, at 0.6000572, whereas the correlation between the banding overlay 610 and the single exposure image of the scene 620 is low and close to zero, at −0.01730139. In this example, it is determined that there is likely a match with the modulated light source and therefore there is a likelihood that banding as a result of the illumination source is occurring in the HDR image 630.

Figure 7:
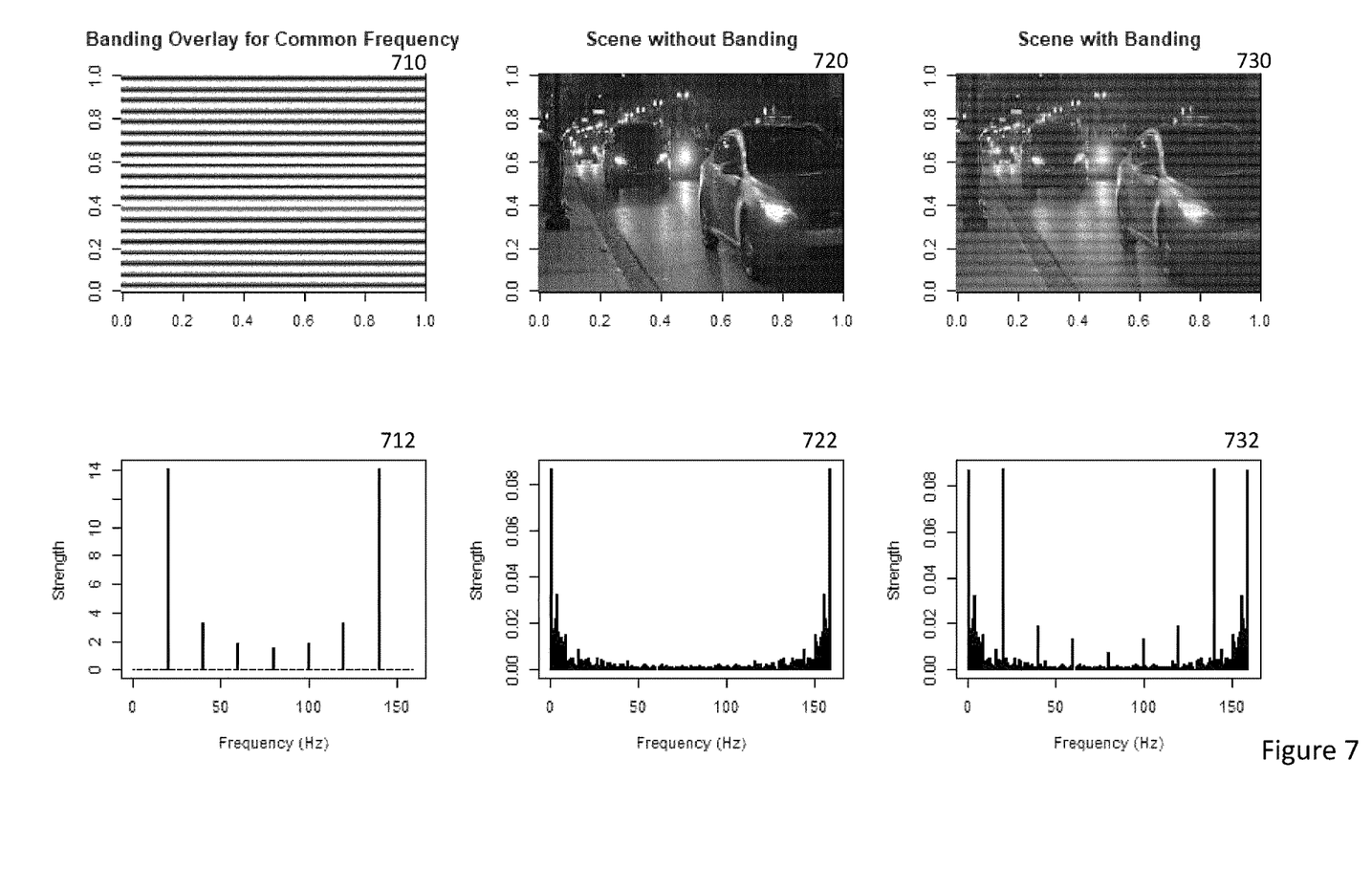

FIG. 7 illustrates another example including an image of a banding overlay 710 of a known modulated light source and images of another typical night driving scenario 720, 730. The night driving scenario includes vehicle headlights which induce banding in the HDR image 730.

The power spectra correlation value between the banding overlay 710 and the HDR image 730 of the scene is high, at 0.659236, whereas the correlation between the banding overlay 710 and the single exposure image of the scene 720 is close to zero, at −0.017341. Also, in this other example, it is determined that there is likely a match with the modulated light source. Again, there is a likelihood that banding as a result of the illumination source is occurring in the HDR image 730

Figure 8:
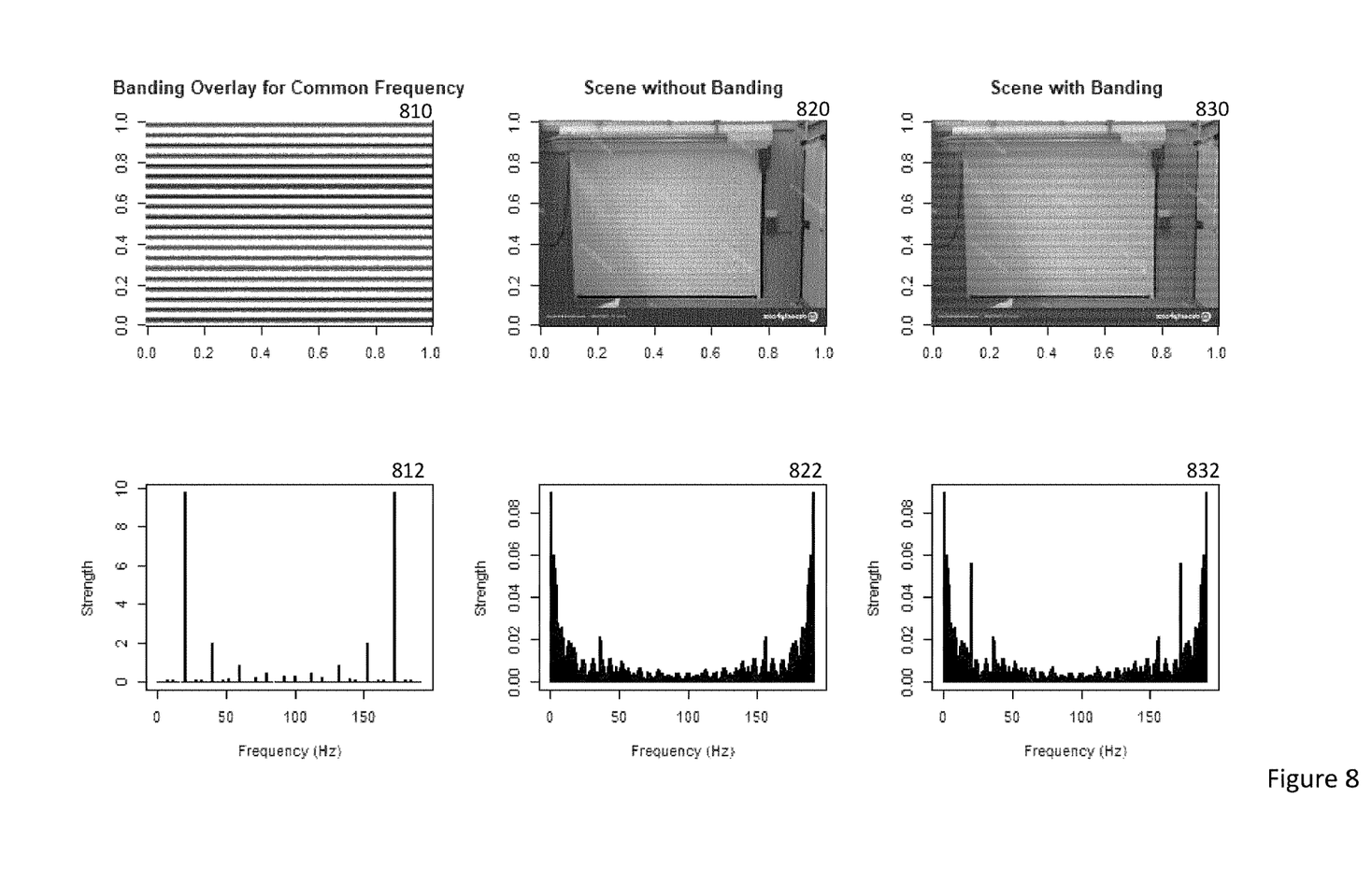

FIG. 8 shows a banding overlay 810 of a known modulated light source and images 820, 830 of a scene including an electric roll-up garage door. In this case, light sources are not represented within the image, as the scene is illuminated by LED lighting from the ego vehicle headlights causing banding in the HDR image 730.

In this example, the power spectrum correlation value between the banding overlay 810 and the HDR image 830 of the scene is registering at 0.506129. Note that this value is lower than the correlation value obtained in previous examples. This is because the scene includes a regular repeating structure which dominates the image. However, the correlation between the banding overlay 810 and the single exposure image of the scene 820 is still close to zero, at −0.05018271.

In variations of the above described implementation, rather than performing a correlation between the HDR image spectra 632,732,832 and spectra 612, 712, 812 for various known light sources, a simple threshold test could be employed and if the amplitude of a given set of frequencies in the HDR image spectra is above a given threshold, then this can be taken as indicating unwanted banding being caused by a modulated light source in the HDR image.

In further variations, the method may be modified to combine results obtained from a sequence of component and HDR images. So for example, if the results from steps 405, 406 remain consistently high even though the ego vehicle is moving, this can be a strong indicator that street lights or lights of other vehicles which may not always appear directly in the images could be causing artefacts in the HDR images.

Still further variations of the above described embodiments are possible. For example, other techniques similar to those disclosed in PCT Application WO2011/000392 can also be used within step 404 to determine if light sources are present within a scene being imaged. Other implementations may also attempt to directly identify the type of artefacts caused by illumination by modulated light sources within the HDR image 220, although appreciating that the results of such analysis may not contribute as reliably as the tests of steps 404-406 and so may carry a lower weight in step 408 than the other contributions.

The invention claimed is:

1. An image processing method operable in an image processing system comprising an image capturing device and a processor, the method comprising the processor:
    acquiring from the image capturing device, successive sets of component images of a scene, each image within a set having a different exposure than each other component image of the set;
    generating a high dynamic range, HDR, image from an associated set of component images;
    performing a spectral analysis of said generated HDR image to determine whether the HDR image comprises spectral components indicative of a lighting of the scene by a modulated light source;
    analysing meta-data associated with a set of component images to determine a difference between meta-data for one component image of the set and meta-data for at least one other component image of the set, any difference being indicative of an artefact caused by illumination of said scene by a modulated light source; and
    combining a result of said spectral analysis and said meta-data analysis to provide an indication that illumination of said scene by a modulated light source is causing a visible artefact in at least one of said HDR images; and responsive to such an indication, changing a HDR operating mode of the image processing system.

2. The method according to claim 1, wherein said meta-data analysis is based on one of more of: white balance information and/or colour temperature of said set of component images.

3. The method according to claim 1, wherein said meta-data analysis is performed on a set of component images associated with said HDR image.

4. The method of claim 1, wherein changing said operating mode of the image processing system comprises switching from providing said HDR image to a display to providing a single exposure image of said scene to said display.

5. The method of claim 4, wherein said single exposure image comprises a component image of subsequently acquired sets of component images.

6. The method of claim 1, wherein changing said operating mode of the image processing system comprises changing image acquisition parameters for subsequently acquired sets of component images.

7. The method of claim 6, wherein changing said image acquisition parameters comprises reducing said difference in exposure between component images of subsequently acquired sets of component images.

8. The method of claim 1, wherein changing said operating mode of the image processing system comprises switching to a single image acquisition mode for a given period of time.

9. The method of claim 1, wherein said performing a spectral analysis of the HDR image comprises:
    performing a stacked Fast Fourier Transform, FFT, of a grayscale version of said HDR image to obtain a spectral energy distribution of the HDR image; and
    comparing spectral energy distribution with respective power spectra of one or more known modulated light sources to determine whether the HDR image comprises spectral components indicative artefacts in said HDR image caused by the lighting of the scene by the modulated light source.

10. A computer program product comprising computer readable instructions stored on a non-transitory computer readable medium which when executed on a processor are arranged to carry out the method according to claim 1.

11. An image processing system comprising an image capturing device and a processor, the processor being configured to perform the method of claim 1.

12. A vehicle including the image processing system of claim 11 and a display for displaying images provided by said image processing system.

13. An image processing method operable in an image processing system comprising an image capturing device and a processor, the method comprising the processor:
  acquiring from the image capturing device, successive sets of component images of a scene, each image within a set having a different exposure than each other component image of the set;
  generating a high dynamic range, HDR, image from an associated set of component images;
  performing a spatial analysis of one or more of component images of a set or said generated HDR image to determine whether a modulated light source is present in said scene being imaged;
  analysing meta-data associated with a set of component images to determine a difference between meta-data for one component image of the set and meta-data for at least one other component image of the set, any difference being indicative of an artefact caused by illumination of said scene by a modulated light source;
  combining a result of said spatial analysis and said meta-data analysis to provide an indication that illumination of said scene by a modulated light source is causing a visible artefact in at least one of said HDR images; and
  responsive to such an indication, changing a HDR operating mode of the image processing system.

14. The method according to claim 13 further comprising:
  performing a spectral analysis of said generated HDR image to determine whether the HDR image comprises spectral components indicative of a lighting of the scene by a modulated light source; and
  combining said results of said spatial analysis, meta-data analysis and said spectral analysis to provide said indication that illumination of said scene by a modulated light source is causing a visible artefact in at least one of said HDR images.

15. The method of claim 13, further comprising: performing said spatial analysis with one of a classifier, an artificial neural network or a rules based engine.

* * * * *